Feb. 25, 1964   E. L. MARZULLO ETAL   3,122,117
FLUX APPLYING MEANS
Filed Feb. 1, 1960   3 Sheets-Sheet 2

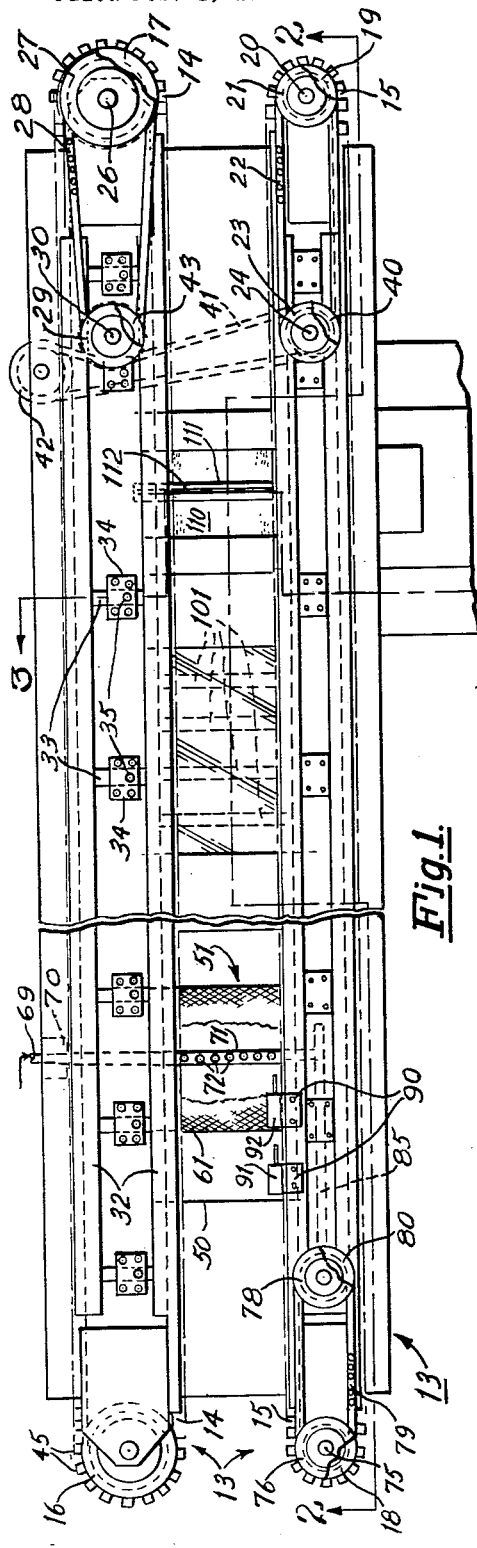
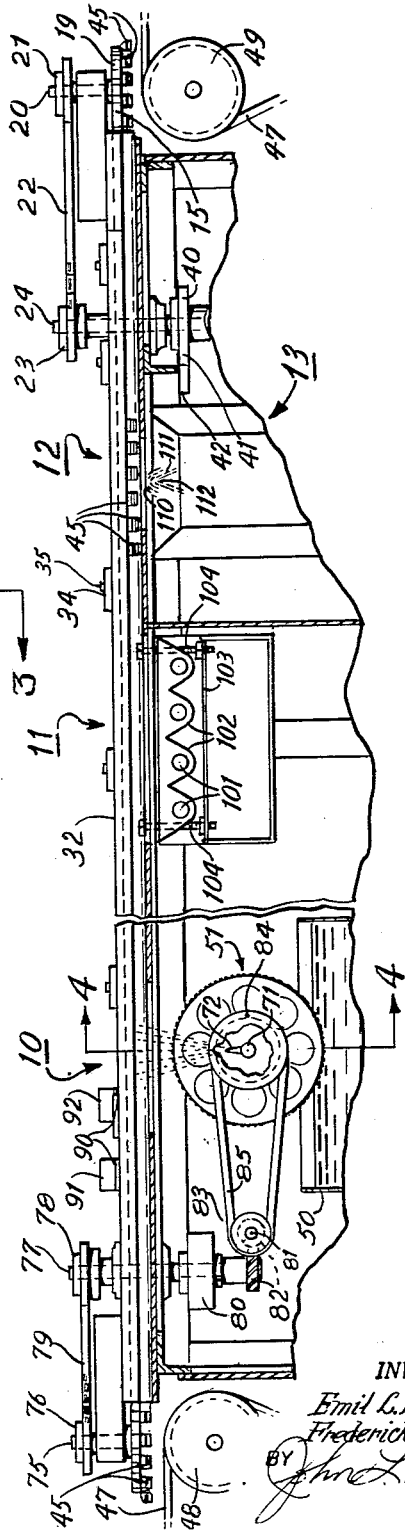

INVENTORS.
Emil L. Marzullo
Frederick H. Scheeler
BY John L. Siegreffe
ATTY.

United States Patent Office 3,122,117
Patented Feb. 25, 1964

3,122,117
FLUX APPLYING MEANS
Emil L. Marzullo and Frederick H. Scheeler, Chicago, Ill., assignors to Admiral Corporation, Chicago, Ill., a corporation of Delaware
Filed Feb. 1, 1960, Ser. No. 5,954
6 Claims. (Cl. 113—95)

This invention relates to an automatic soldering method and apparatus, and to a method and apparatus for preparing objects for soldering. It is an object of the invention to provide an improved method and apparatus of such character.

In accordance with the preferred embodiment of the present invention objects to be soldered are carried in sequence past a flux applicator. As each successive object passes the applicator soldering flux is applied thereto uniformly and without substantial waste. The successive objects to be soldered then preferably pass by preheating lamps and then pass to the soldering station. The particular machine illustrated in the drawings is intended to handle printed circuit boards carrying electrical components whose leads extend through openings in the board and are to be soldered to conductive portions of the printed circuit board. It will be appreciated, of course, that the machine is readily adapted to the handling of other objects which are to be soldered.

Also in accordance with the preferred embodiment of the invention, the flux applicator includes a rotatable, generally cylindrical screen, each portion of which dips into a supply of flux during each revolution and carries upwardly a thin film of the flux. Air blower means are provided with an outlet within the cylindrical screen for blowing this film of flux off the screen and against the object to be soldered. Because of possible irregularity in the spacing between the objects to be soldered and because of the fact that it was found to be impractical to employ a cylindrical screen without axially extending supports, control apparatus is provided for controlling blower operation and screen rotation in accordance with the angular orientation of the screen and the presence of objects to be soldered at various predetermined locations.

Accordingly, it is another object of the invention to provide an improved method and apparatus for applying flux to objects preparatory to soldering.

It is a further object of the invention to provide an improved method and apparatus for applying flux to objects preparatory to soldering, such method and apparatus applying flux uniformly and solely to such objects without significant waste.

It is a still further object of the invention to provide an improved method and apparatus for preheating objects to be soldered.

Another object of the invention is to provide an improved fluxing, preheating and soldering method and apparatus which is efficient, reliable and economical.

Further features of the invention pertain to the particular arrangement of the steps and elements of the automatic soldering method and apparatus, whereby the above outlined and additional features thereof are attained.

The invention, both as to its organization and method of operation, together with further objects and advantages thereof, will best be understood by reference to the following specification, taken in connection with the accompanying drawings, in which:

FIGURE 1 is a plan view of a soldering machine constructed in accordance with the present invention;

FIG. 2 is a side elevational view, partially broken away, of the same machine;

Figure 3:
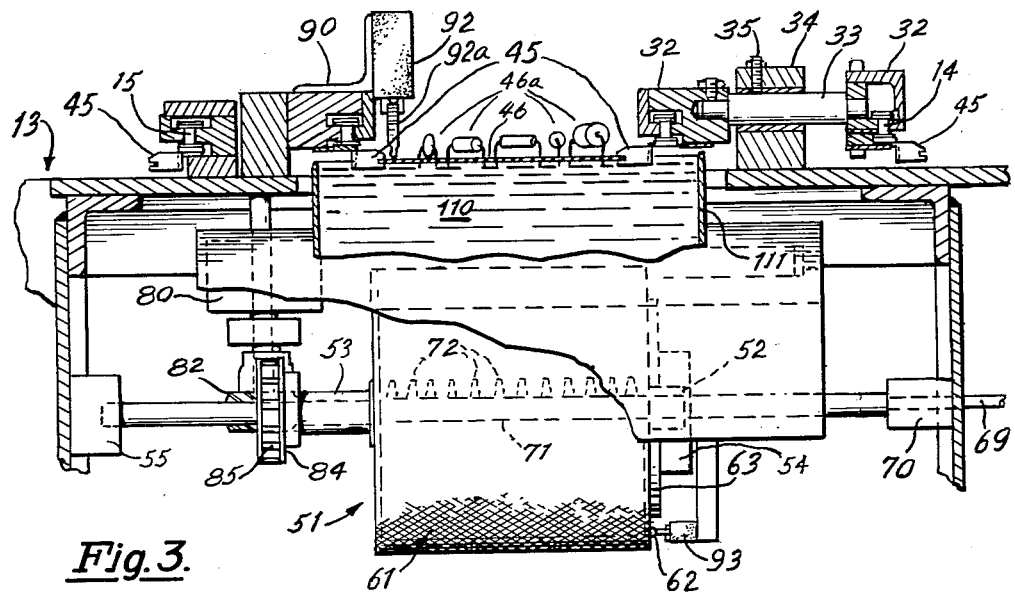
FIG. 3 is a partial cross-sectional taken along the line 3—3 of FIG. 1.

The entire machine is preferably mounted on a single base or framework which may be of any suitable form and which of itself does not constitute a feature of the present invention. Accordingly, the base or framework is not described herein although various portions thereof may be seen in FIGS. 1–3.

In general, the machine includes a flux applicator station 10, a preheating station 11, a soldering station 12 and conveyor apparatus 13 for carrying objects to be soldered past the successive stations 10, 11 and 12.

The particular embodiment of the invention illustrated in the drawings is intended to solder electrical components to printed circuits on thin flat boards, and the conveyor apparatus 13 is specifically designed to handle such printed circuit boards with components attached thereto. More particularly, the conveyor apparatus 13 consists of a pair of endless link chains 14 and 15 which travel along tracks in a manner well known in the art. The chain 14 operates over sprockets 16 and 17 and the chain 15 operates over sprockets 18 and 19. The sprockets 16 and 18 are idler sprockets, the chains 14 and 15 being driven respectively by the sprockets 17 and 19. As seen best in FIG. 2, the sprocket 19 is secured to a short shaft 20 to which there is also secured a sprocket 21. The sprocket 21 is connected by a chain 22 to a sprocket 23 which is secured to a power-driven shaft 24.

A similar construction is provided for the conveyor chain 14, the sprocket 17 being secured to a shaft 26 to which there is also secured a sprocket 27. The sprocket 27 is connected through a chain 28 to a sprocket 29 secured to a power-driven shaft 30.

The two sprockets 16 and 17 supporting the conveyor chain 14 are larger in diameter than the sprockets 18 and 19 in order to permit the conveyor chain 14 to span certain adjustment apparatus associated therewith. More particularly, the conveyor chain 14 along with the sprockets 16, 17, 27 and 29 are movable toward and away from the conveyor chain 15. The conveyor chain 14 along with the associated sprockets and shafts are supported on a movable framework 32 which includes a series of shafts 33, each of which extends through a pillow block 34, all as best seen in FIGS. 1 and 3. Since the shafts 33 are slidable within the pillow blocks 34 it will be seen that the framework 32 along with the conveyor chain 14 and its associated sprockets can be moved toward and away from the cooperating conveyor chain 15. The shafts 33, and hence the entire framework 32, may be locked in adjusted position by set screws 35 arranged in each pillow block 34.

In the illustrated embodiment of the invention, this method of adjustment is limited by practical factors to a total adjustment of approximately one inch. Where greater adjustment is desired the pillow blocks 34 may be adjustable in their positions on the machine frame or base. A number of spaced apart mounting holes may, for example, be provided for each pillow block 34. Since the adjustability of the spacing between the conveyor chains 14 and 15 does not of itself constitute a feature of the present invention, it is not described in further detail herein.

Returning to the two previously mentioned drive shafts 24 and 30, it will be appreciated that they must be driven at constant relative speeds. As shown in FIG. 1, this is accomplished through a fixed ratio drive connection which permits the shaft 30 to move with respect to the shaft 24 along with the entire framework 32. A sprocket 40 is secured to the shaft 24, as seen best in FIG. 2, and a chain 41 extends over this sprocket and over an idler sprocket 42. Another sprocket 43 shown in part in FIG. 1 and which is identical to the sprocket 29 and is secured to the shaft 30 directly below the sprocket 29, bears against the chain 41, and is driven thereby. It will be appreciated that shifting of the framework 32 in the manner described above will merely cause the second sprocket on the shaft 30 to roll along the chain 41 without interrupting effective driving engagement therewith. It will also be seen that a positive relationship between the speeds of the two drive shafts 24 and 30 is maintained. In the illustrated embodiment of the invention the shafts 24 and 30 rotate at the same speed, the linear velocities of the drive chains 22 and 28 are equal, and the velocities of the conveyor chains 14 and 15 are equal. The entire conveyor system 13 is preferably driven through the shaft 24 by any suitable drive means.

The conveyor chains 14 and 15 are of a conventional and well known form, alternate links including a laterally extending jaw member 45, as best seen in FIG. 3. These jaws are arranged to receive the edges of printed circuit boards 46 of a specified thickness, which boards may carry electrical components 46a having leads extending down through the board 46.

It may now be seen that with the frame 32 adjustably positioned such that the jaw members 45 of the respective conveyor chains 14 and 15 are spaced a desired distance apart, a printed circuit board of a specified width and of standard thickness may be received between the jaw members of the two conveyor chains and may be conveyed thereby past the three operating stations 10, 11 and 12 of the overall machine. Such printed circuit boards may be fed to the conveyor apparatus by hand or by other conveyor apparatus. The boards may, for example, be fed to the above described conveyor apparatus by a conveyor belt 47 passing over a pulley 48, as seen in FIG. 2. If desired, the same conveyor belt 47 may pass under or around the soldering machine and over a pulley 49 at the right hand end of the machine where it may catch the soldered or tinned printed circuit boards as they are dropped by the diverging conveyor chains 14 and 15.

At the flux applicator station 10 a flux pot 50 is provided, within which flux is maintained at a desired height and at a desired temperature through any conventional means. Immediately above the flux pot 50 is a flux applicator drum 51, seen in FIGS. 1 and 2 and shown in greater detail in FIG. 4.

The drum 51 is generally cylindrical in its overall form with stub shafts 52 and 53 extending coaxially from the opposite ends thereof. Suitable bearings 54 and 55 are secured to the frame or base of the machine for rotatably supporting these stub shafts.

The drum 51 consists primarily of a pair of end plates 56 and 57 having a plurality of openings 58 therethrough, a generally cylindrical plate 59 having a number of large openings 60 extending therethrough, and a screen 61 which overlies the cylindrical plate 59 and covers the openings 60. These major portions of the drum may be secured together in any desired manner. Preferably, however, the screen 61 is readily removable for cleaning or replacement.

The radially outer portion of the end plate 56 has a separation between it and the cam plate, so as to bring the cam plate outside of the flux pot 50, so that it will stay clean of flux. There is provided a plurality of cam pins 62 in a circle which is concentric with the axis of rotation of the drum 51, one pin 62 being provided for each opening 60. Radially inwardly of the circle of cam pins 62 is a cam ring 63 which is also concentric about the axis of rotation of the drum 51. This cam ring has a plurality of recesses 64, one for each opening 60. The cam pin 62 and the cam ring 63 cooperate in certain automatic control of the machine in a manner explained in detail below.

As may be seen best in FIG. 2, each portion of the screen 61 is caused to dip into the liquid flux contained within the flux pot 50 during each revolution of the drum 51. The screen is selected to be of such mesh that the liquid flux employed will form a continuous film over the screen as it emerges from the flux pot. For conventional viscosity of flux it has been found that a screen of 26 mesh with a wire diameter of .016" is satisfactory for this purpose. It is intended that the film of flux carried by the screen 61 be blown off the screen and against the lower surfaces of the printed circuit boards 46 as they are carried past the flux applicator station 10 by the conveyor means 13. For this purpose it is necessary that air under pressure be brought into the drum 51.

Compressed air may be supplied to the machine from any suitable source, although it will be appreciated that the air should be well screened or filtered. As illustrated in FIG. 1, air under pressure is conducted from a suitable source through a pipe or tube 69 to an electrically operated air valve 70. From the valve 70 a pipe 71 conducts air through the stub shaft 52 of the drum 51 to the interior of the drum, the shaft 52 being made hollow for this purpose. The pipe 71 extends over the axial length of the openings 60 and has orifices or nozzles arranged over the axial length of these openings such that air may be directed upwardly through the openings 60 substantially uniformly over the length of the opening. In the illustrated embodiment of the invention a plurality of nozzles 72 extend upwardly from the pipe 71 in the manner best seen in FIG. 3. The nozzles 72 are preferred to simple orifices since they direct the air along a narrower band.

Power for rotation of the drum 51 is taken from the conveyor means 13 in the illustrated embodiment of the invention. In FIG. 2 it may be seen that the sprocket 18 is secured to a short shaft 75 to which there is also secured another sprocket 76. To the right thereof is another shaft 77 carrying a sprocket 78 which is connected to the sprocket 76 through a chain 79. It will be seen that the shaft 77 is driven continuously as long as the conveyor means 13 are in operation.

Secured to the lower end of the shaft 77 is the driving portion of an electrically operated clutch 80. The driven portion of the clutch 80 is connected to a shaft 81 through suitable gearing generally designated 82. A sprocket 83 is carried by the shaft 81 and is connected to a sprocket 84 mounted on the stub shaft 53 of the drum 51 through a chain 85. It will now be seen that when the clutch 80 is engaged the drum 51 will be driven by the conveyor means 13. In the illustrated embodiment of the invention the peripheral speed of the screen 61 is equal to the linear speed of the conveyor means 13.

It is desirable that the flow of air through the nozzle 72 be stopped, as by closing of the valve 70, whenever there is no printed circuit board 46 directly above the drum 51, since flux would otherwise be wasted. It is also desirable that the air flow be stopped when a rib 60a of the drum is passing through the air path, since the rib 60a would necessarily divert the flow of air whereby flux would be sprayed about where it is not wanted and would not be available for the desired spraying onto the printed circuit boards. Control means are therefore provided for controlling the flow of air in accordance with these requirements.

It is also desirable that the drum 51 be made to rotate in a given phase relationship with respect to the movement of each successive printed circuit board past the drum in order that a rib 60a of the drum may not pass between the nozzle 72 and the printed circuit board 46 during the spraying of that board. To accomplish this, control means are also provided for stopping the drum 51 in a predetermined orientation during the approach of a printed circuit board, and for starting rotation of the drum when the same printed circuit board reaches a predetermined location. With such an arrangement it may be seen that the printed circuit board may be made to pass by the flux applicator drum during a time interval when no rib 60a passes between the nozzles 72 and the printed circuit board. These control means, which are described immediately below, also provide for continuous rotation of the flux applicator drum during time intervals between arrivals of printed circuit boards, whereby flux is not permitted to harden on the screen.

The control apparatus referred to above includes a switch 91 and a switch 92 which are adjustably mounted, as by brackets 90, in positions overlying the path of the printed circuit boards 46, and which are operated by passage of printed circuit boards therepast. The control apparatus also includes a switch 93 operated by the cam pins 62 (see FIGS. 4 and 5) and a switch 94 operated by the cam ring 63. Each of the four switches 91–94 includes a single, normally open pair of contacts, which contacts are closed by actuation of the switch. Each switch has a spring biased actuating arm designated 91a, 92a, 93a, or 94a. Since the switches 91–94 may be of conventional and well-known form and do not of themselves constitute a feature of the present invention, they are not described in further detail herein.

Figure 6:
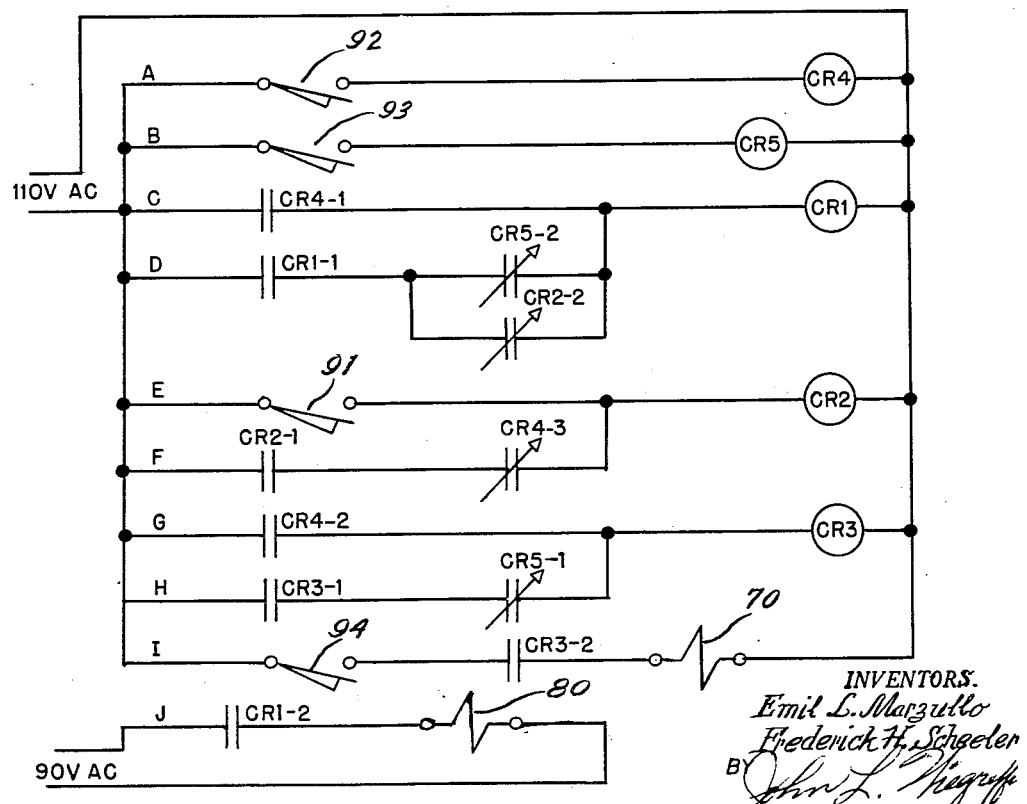
FIG. 6 is a schematic wiring diagram showing various switches (appearing in FIGS. 1–5) and five relays (not otherwise illustrated) for controlling rotation of the flux applicator drum and operation of the air blower means.

The switches 91–94 cooperate with relays designated CR1, CR2, CR3, CR4 and CR5 which may be of conventional form and which cooperate electrically with the four switches 91–94 to control the air valve 70 and the clutch 80 and are therefore shown only in the circuit diagram of FIG. 6. As is conventional in the art, the operating coils of the relays CR1–CR5 are shown as circles in the circuit diagram, and the contacts of the relays are shown as parallel lines and are identified with the relay of which they form a part. Thus, for example, three pairs of contacts operated by and forming a part of the relay CR4 are designated CR4–1, CR4–2, and CR4–3. Finally, all normally closed relay contacts are so indicated by a diagonal line intersecting the two parallel lines which designate a pair of contacts.

Operation of the control means is explained below starting with actuation of the switch 92 by passage of a printed circuit board 46 thereunder, the drum 51 being at a standstill with switch 91 open and switch 93 closed. Closure of the switch 92 energizes the relay CR4 as may be seen in line A of FIG. 6. Energization of the relay CR4 closes relay contact CR4–1 (see line C) to energize the relay CR1. This relay locks itself in energized position through its own contact CR–1 (see line D) and either of two contacts of two other relays discussed below.

Energization of the relay CR1 also closes contacts CR1–2 (see line J) to energize the clutch 80 and initiate rotation of the drum 51. As is explained below, the drum 51 was previously stopped in a predetermined angular orientation whereby the starting of drum rotation by closure of the switch 92 permits a predetermined relationship between subsequent angular orientations of the drum 51 and subsequent positions of the printed circuit board 46 which caused actuation of the switch 92.

Energization of the relay CR4 also closes contact CR4–2 (see line G) which energizes relay CR3. This relay also locks itself in energized position through one of its own contacts CR3–1 and through a normally closed contact of another relay described below. Energization of the relay CR3 also closes contact CR3–2 shown in line I. It will be apparent that closure of the contact CR3–2 conditions the air valve 70 for energization by closure of the switch 94.

Figure 5:
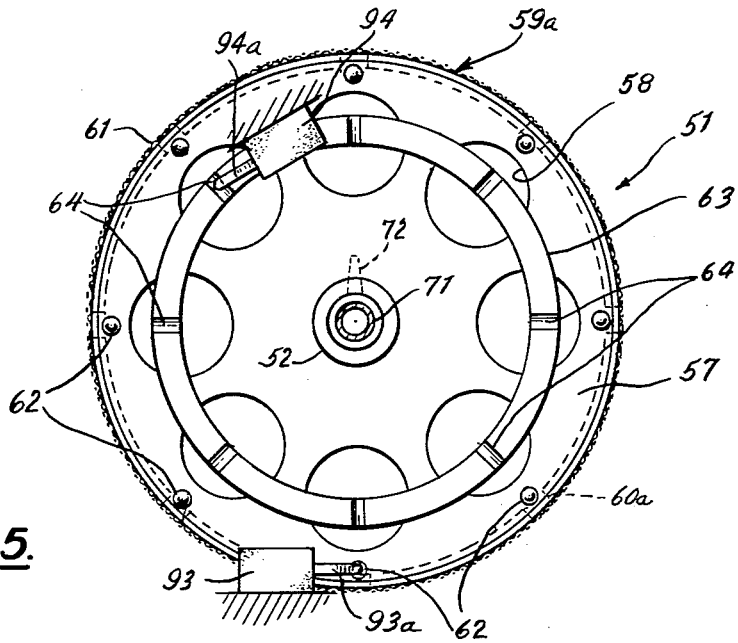
FIG. 5 is an end view showing the drum of FIG. 4 as viewed from the left in FIG. 4.

By reference to FIG. 5, it will be seen that the switch 94 is maintained in actuated or "switch-closed" position during the major portion of each revolution of the drum 51. More particularly, the switch 94 is permitted to open only when its arm 94a enters the narrow slots 64. During these brief intervals a rib 60a passes through the path of the air stream which would otherwise be emanating from the nozzles 72.

Energization of the relay CR4 also opens normally closed contacts CR4–3. This opens a hold-in circuit for the relay CR2, discussed below.

It will now be seen that closure of the switch 92 by a board 46 energizes the clutch 80 to initiate rotation of the drum 51, and energizes the air valve 70 to initiate blower operation. These conditions continue as long as the board 46 maintains the switch 92 in closed position. It should be noted, however, that opening of the switch 94 by reception of its arm 94a within a slot 64 in the cam ring 63 will temporarily deactuate blower operation even though the switch 92 is held in closed position.

Figure 4:
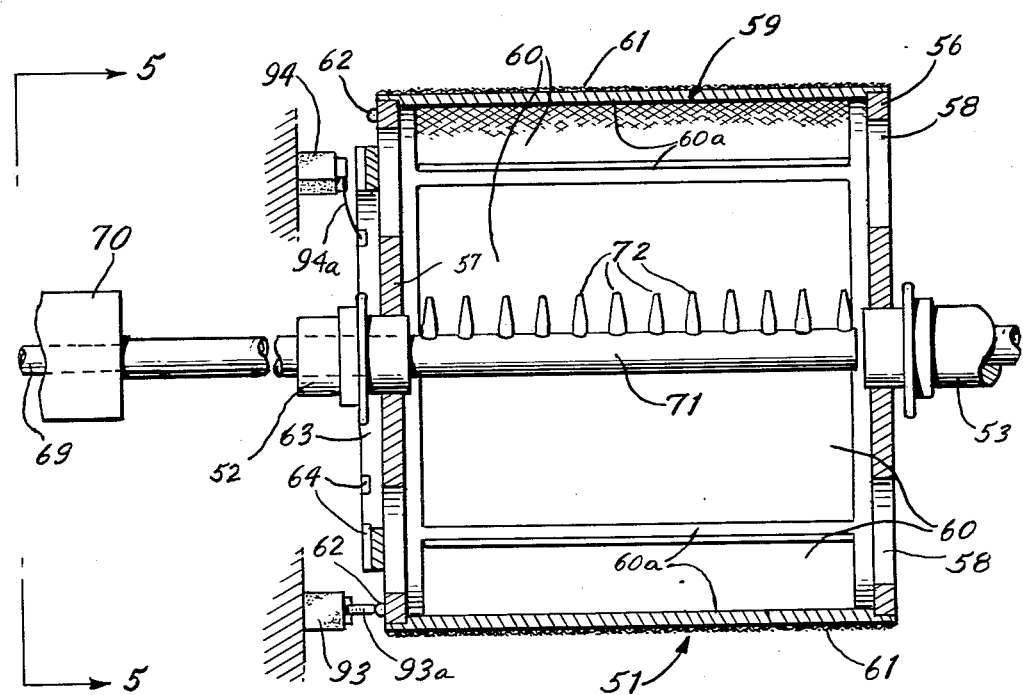
FIG. 4 is an axial cross-sectional view of the flux applicator drum taken along the line 4—4 of FIG. 2.

When the board 46 moves beyond the switch 92 and permits the latter to open, CR1 will continue to be held in whereby the clutch 80 continues to be energized. Accordingly, the drum 51 will continue to rotate, whereby the screen 61 is continually dipped into the flux such that flux may not dry on the screen. The relay CR3, controlling operation of the air valve 70, will however be held in energized position only until such time as the switch 93 of FIGS. 4 and 5 is next actuated by a cam pin 62. As seen in line B, closure of the switch 93 energizes relay CR5 which opens the normally closed contacts CR5–1 of line H. This breaks the hold-in circuit of the relay CR3 whereby the air valve 70 is deenergized.

Energization of the relay CR5 also opens normally closed contacts CR5–2 in line D which is the hold-in circuit for the relay CR1 controlling the drive clutch 80. However, the contacts CR5–2 are paralleled by normally closed contacts of another relay discussed below, whereby the relay CR1 may normally remain in energized position.

When a succeeding printed board 46 closes the switch 91 it energizes the relay CR2 of line E. This relay holds itself in energized position through its own contact CR2–1 and through previously mentioned, normally closed contacts CR4–3, the relay CR4 presently being deenergized. Energization of the relay CR2 also opens normally closed contacts CR2–2 in line D which is the hold-in circuit of the relay CR1. With the contacts CR2–2 open, this hold-in circuit for the relay CR1 will be opened by the next regular operation of the relay CR5 of the switch 93. More particularly, the next operation of the switch 93 by a cam pin 62 energizes the relay CR5, deenergizes the relay CR1 and deenergizes the clutch 80. The drum 51 is therefore stopped in a predetermined angular orientation. Accordingly, closing of the switch 92 by further forward movement of the printed circuit board 46 will initiate rotation of the drum with the printed circuit board 46 in a predetermined position and with the drum 51 in a predetermined angular orientation, all in the manner described above. It should also be noted that closing of the switch 92 and energization of the relay CR4 opens the previously mentioned, normally closed contacts CR4–3 in the holding circuit of the relay CR2 (line F).

It will now be seen that the control devices of FIG. 6 provide for a number of operations which are desirable, particularly in view of the presence of the ribs 60a extending axially between and defining the openings 60 in the drum 51. Specifically, these control devices terminate blower operation when a rib 60a is in the path of the air stream. They also terminate blower operation when there is no object in position to be sprayed. The control devices provide for stopping rotation of the drum at a predetermined angular orientation after an object to be soldered has reached a predetermined location, and for starting rotation of the drum when the object to be soldered reaches a second predetermined location, whereby one of the openings 60 may face the object as the object passes through the path of the air stream. Still further, the control devices permit substantially continuous rotation of the drum whereby flux is prevented from drying on the drum. This is of particular importance in the event of a temporary interruption in the supply of printed circuit boards to the machine.

As the printed circuit boards leave the flux applicator station they are brought next to the preheating station 11. At this station a number of tubular heat lamps 101 are arranged in generally cylindrical reflectors 102 which are open at the top and serve to concentrate the radiated heat of the lamps 101 upwardly against printed circuit boards 46 which are supported thereabove by the conveyor means 13. A framework or box 103 for supporting the reflectors 102 and the lamps 101 is shown adjustably positioned on the frame or base of the machine through screws 104 which hang from the frame of the machine and threadedly engage nuts 105 which are spot welded to the frame or box 103. Since the controls for the lamps 101, as well as the wiring and sockets, may be of conventional form and do not of themselves constitute a feature of the present invention, they are not shown in the drawings or described in detail herein.

The raising of the temperature of the printed circuit board and of the component leads by the passage of the boards over the plurality of heating lamps has been found to have a desirable effect on the action of the flux and on the succeeding soldering operation.

The printed circuit boards 46 are carried from the preheating station 11 to the soldering station 12. Preferably, the soldering or tinning operation is performed through the use of a conventional and well known device through which a fountain 110 of solder plays against the lower surfaces of the printed circuit boards 46. In such a device molten solder is forced upwardly through a nozzle 111 forming a slot 112, most of the solder flowing down the sides of the nozzle 111 and being recirculated. It will be appreciated that the fountain of molten solder constitutes a pool of solder through which objects may move while travelling in a straight line. More particularly, the fountain of solder may bear continuously against the lower surface of the boards 46, the lead ends of the electrical components 46a being moved through a mass of molten solder. A thin film of solder will, of course, adhere to the flux-coated and preheated metal portions of the printed circuit boards 46 and to the component leads. Since the soldering apparatus employed at the soldering station 12 of the illustrated machine is preferably of a type well known in the art, and since it does not of itself constitute a feature of the present invention, it is not described herein or illustrated in the drawings in further detail.

An improved method and apparatus have now been described for fluxing, preheating and soldering, which method and apparatus are inherently efficient, reliable and economical.

While there has been described what is at present considered to be the preferred embodiment of the invention, it will be understood that various modifications may be made therein, and it is intended to cover in the appended claims all such modifications as fall within the true spirit and scope of the invention.

The invention having thus been described, what is claimed and desired to be secured by Letters Patent is:

1. In an automatic soldering machine, flux applicator means comprising a hollow, cylindrical, rotatable member having a plurality of circumferentially aligned openings in the cylindrical wall thereof, a screen covering said openings, a flux container arranged generally below said member, said screen being arranged to dip into the flux in said container as said member rotates, air blower means having an air outlet within said member for blowing flux off said screen and against an object to be soldered, means for moving objects to be soldered past said member in sequence, and automatic control means for stopping rotation of said member at a predetermined angular orientation after an object to be soldered has reached a predetermined location with respect to said member and for starting rotation of said member when said object reaches a second predetermined location with respect to said member whereby one of said openings in the cylindrical wall of said member may face said object when said object passes by said member.

2. In an automatic soldering machine, flux applicator means comprising a hollow, cylindrical, rotatable member having a plurality of circumferentially aligned openings in the cylindrical wall thereof, a screen covering said openings, a flux container arranged generally below said member, said screen being arranged to dip into the flux in said container as said member rotates, air blower means having an air outlet within said member for blowing flux off said screen and against an object to be soldered, feed means for moving objects to be soldered past said member in sequence, automatic control means for actuating said blower means only when one of said openings is in position to permit the passage therethrough of the air stream from said air outlet, and means for coordinating said feed means and said automatic control means, whereby said objects to be soldered are positioned to receive the flux blown from said screen by said blower means.

3. In an automatic soldering machine, flux applicator means comprising a hollow, cylindrical, rotatable member having a plurality of circumferentially aligned openings in the cylindrical wall thereof, a screen covering said openings, a flux container arranged generally below said member, said screen being arranged to dip into the flux in said container as said member rotates, air blower means having an air outlet within said member for blowing flux off said screen and against an object to be soldered, means for moving objects to be soldered past said member in sequence, and automatic control means for actuating said blower means only when one of said objects is in position to receive the flux blown from said screen by said blower means and only when one of said openings is in position to permit the passage therethrough of the air stream from said air outlet.

4. In an automatic soldering machine, flux applicator means comprising a hollow, cylindrical, rotatable member having a plurality of circumferentially aligned openings in the cylindrical wall thereof, a screen covering said openings, a flux container arranged generally below said member, said screen being arranged to dip into the flux in said container as said member rotates, air blower means having an air outlet within said member for blowing flux off said screen and against an object to be soldered, means for moving objects to be soldered past said member in sequence, and automatic control means for actuating said blower means only when one of said objects is in position to receive the flux blown from said screen by said blower means and only when one of said openings is in position to permit the passage therethrough of the air stream from said air outlet, and for stopping rotation of said member at a predetermined angular orientation after an object to be soldered has reached a predetermined location with respect to said member and for starting rotation of said member when said object reaches a second predetermined location with respect to said member whereby one of said openings in the cylindrical wall of said member faces said object when said object passes by said member.

5. In an automatic soldering machine, flux applicator means comprising a hollow, cylindrical, rotatable member having a plurality of longitudinal ribs defining openings in the cylindrical wall thereof, a screen covering said openings, a flux container arranged generally below said member, said screen arranged to dip into the flux in said container as said member rotates, drive means for rotating said member, air blower means including a nozzle within said member for providing a flow of air for blowing flux off said screen and against an object to be soldered, means for moving objects to be soldered past said member in sequence, and automatic control means including first detector means for energizing said drive means and said air blower means when an object to be soldered is adjacent said member, and second detector means for deenergizing said air blower means when said ribs enter into said flow of air, whereby said flow of air is prevented from blowing against said ribs.

6. In an automatic soldering machine, flux applicator means comprising a hollow, cylindrical, rotatable member having a plurality of longitudinal ribs defining openings in the cylindrical wall thereof, a screen covering said openings, a flux container arranged generally below said member, said screen being arranged to dip into the flux in said container as said member rotates, drive means for rotating said member, air blower means including a fixed nozzle within said member for providing a flow of air for blowing flux off said screen and against an object to be soldered, means for moving objects to be soldered past said member in sequence, and automatic control means including first detector means for energizing said drive means and said air blower means when an object to be soldered is adjacent said member, second detector means for deenergizing said air blower means when said ribs enter into said flow of air, and position responsive detector means detecting an object approaching said member and deenergizing said drive means and stopping said member with an opening in a predetermined position with respect to said nozzle means, said drive means being again energized under control of said first detector means when said object reaches a second predetermined position with respect to said member, whereby an object is orientated with respect to said member and said flow if air is prevented from blowing against said ribs.

References Cited in the file of this patent

UNITED STATES PATENTS

| | | |
|---|---|---|
| 581,294 | Lorillard | Apr. 27, 1897 |
| 1,887,416 | Matlack | Nov. 8, 1932 |
| 2,213,108 | Pollard | Aug. 27, 1940 |
| 2,262,901 | Murphy | Nov. 18, 1941 |
| 2,386,813 | O'Brien et al. | Oct. 16, 1945 |
| 2,528,566 | Whisenhunt | Nov. 7, 1950 |
| 2,646,620 | Geddes et al. | July 18, 1953 |
| 2,698,626 | Rumbaugh | Jan. 4, 1955 |
| 2,756,497 | Gale | July 31, 1956 |
| 2,771,852 | Iles | Nov. 27, 1956 |
| 2,777,419 | Paasche | Jan. 15, 1957 |
| 2,813,502 | Drom | Nov. 19, 1957 |
| 2,869,497 | Lehner | Jan. 20, 1959 |

FOREIGN PATENTS

| | | |
|---|---|---|
| 264,814 | Great Britain | Dec. 22, 1927 |
| 656,482 | France | May 8, 1929 |